(12) United States Patent
Ge et al.

(10) Patent No.: US 10,375,549 B2
(45) Date of Patent: Aug. 6, 2019

(54) INFORMATION SENDING METHOD, APPARATUS AND STORAGE MEDIUM

(71) Applicant: Beijing Xiaomi Mobile Software Co., Ltd., Haidian District, Beijing (CN)

(72) Inventors: Weiyan Ge, Beijing (CN); Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 94 days.

(21) Appl. No.: 15/635,219

(22) Filed: Jun. 28, 2017

(65) Prior Publication Data

US 2018/0027358 A1 Jan. 25, 2018

Related U.S. Application Data

(63) Continuation of application No. PCT/CN2016/090959, filed on Jul. 22, 2016.

(51) Int. Cl.
*H04W 4/70* (2018.01)
*H04L 12/26* (2006.01)
(Continued)

(52) U.S. Cl.
CPC ........... *H04W 4/70* (2018.02); *H04L 43/0852* (2013.01); *H04L 43/0888* (2013.01);
(Continued)

(58) Field of Classification Search
CPC ......... H04W 4/00; H04W 24/02; H04W 4/70; H04W 76/10; H04W 88/08; H04W 28/18;
(Continued)

(56) References Cited

U.S. PATENT DOCUMENTS 9,253,729 B1    2/2016 Sundar et al.
2011/0319069 A1  12/2011 Li
(Continued)

FOREIGN PATENT DOCUMENTS

CN   102137451 A   1/2011
CN   102300328 A   12/2011
(Continued)

OTHER PUBLICATIONS

Partial European search report of European Patent Application No. 17171993.3 from the European Patent office, dated Jul. 24, 2017.
(Continued)

*Primary Examiner* — Charles C Jiang
*Assistant Examiner* — Kyaw Z Soe
(74) *Attorney, Agent, or Firm* — Jun He Law Offices P.C.; James J. Zhu

(57) ABSTRACT

An information transceiving method, apparatus and storage medium are provided. The method includes: establishing a connection with a base station; and during establishing the connection with the base station, sending terminal capability information to the base station for connecting the terminal to a mobile data network in accordance with the terminal capability information, wherein the terminal capability information comprises at least one field representing terminal capability comprising data throughput capability and at least one of latency capability, power consumption capability, reliability capability, enhanced Mobile Broadband (eMBB) capability, massive Machine-Type Communication (mMTC) capability and Ultra Reliable and Low Latency Communication (URLLC) capability.

19 Claims, 12 Drawing Sheets

(51) Int. Cl.
  *H04L 29/06* (2006.01)
  *H04L 29/08* (2006.01)
  *H04W 24/02* (2009.01)
  *H04W 28/18* (2009.01)
  *H04W 76/10* (2018.01)
  *H04W 88/02* (2009.01)
  *H04W 88/08* (2009.01)

(52) U.S. Cl.
  CPC ............ *H04L 67/303* (2013.01); *H04L 69/24* (2013.01); *H04W 24/02* (2013.01); *H04W 76/10* (2018.02); *H04L 67/322* (2013.01); *H04W 28/18* (2013.01); *H04W 88/02* (2013.01); *H04W 88/08* (2013.01)

(58) Field of Classification Search
  CPC .... H04W 88/02; H04L 12/26; H04L 43/0852; H04L 43/0888; H04L 69/24; H04L 67/303; H04L 67/322
  See application file for complete search history.

(56) References Cited

U.S. PATENT DOCUMENTS

| | | | | |
|---|---|---|---|---|
| 2012/0243482 | A1* | 9/2012 | Lu | H04W 28/18 370/328 |
| 2014/0023013 | A1* | 1/2014 | Lee | H04W 28/24 370/329 |
| 2014/0086073 | A1* | 3/2014 | Baykal | H04L 41/5038 370/252 |
| 2014/0376400 | A1 | 12/2014 | Kanamarlapudi et al. | |
| 2015/0365821 | A1* | 12/2015 | Chang | H04W 8/245 455/419 |
| 2016/0192261 | A1* | 6/2016 | Wang | H04W 36/0055 370/331 |

FOREIGN PATENT DOCUMENTS

| | | |
|---|---|---|
| CN | 103427937 A | 12/2013 |
| CN | 103477684 A | 12/2013 |
| CN | 105325035 A | 12/2014 |
| JP | 2014179897 A | 9/2014 |
| JP | 2016092701 A | 5/2016 |
| WO | 2015114695 A1 | 8/2015 |
| WO | 2015127384 A1 | 8/2015 |
| WO | 2016057663 A1 | 4/2016 |
| WO | 2016090124 A1 | 6/2016 |

OTHER PUBLICATIONS

International Search Report of PCT/CN2016/090959.
Pantech: Discussions on CRE bias, published on Feb. 25, 2011, retreived from the Internet <URL: http://www.3gpp.org/ftp/tsg_ran/WG2_RL2/TSGR2_73/Docs/R2-111293.zip>.
Hluawei, HiSilicon: Initial access in NR, published on May 27, 2016, retreived from the Internet <URL: http://www.3gpp.org/ftp/tsg_ran/WG2_RL2/TSGR2_94/Docs/R2-163923.zip>.
First Office Action issued in corresponding Japanese application No. 2017-526882, dated Sep. 11, 2018.

* cited by examiner

INFORMATION SENDING METHOD, APPARATUS AND STORAGE MEDIUM

CROSS-REFERENCE TO RELATED APPLICATIONS

The present application is a Continuation of International Application No. PCT/CN2016/090959, filed Jul. 22, 2016, the entire contents of which are incorporated herein by reference.

TECHNICAL FIELD

The present disclosure generally relates to the technical field of wireless communication technology, and more particularly to an information sending method, apparatus and storage medium.

BACKGROUND

With the development of wireless communication technology, terminals have been pursuing a broader network bandwidth and higher order modulation in order to improve the transmission rate.

Typically, a terminal transmits capability information representing data throughput capability of the terminal to a base station. The base station allocates corresponding network resources to the terminal, according to the data throughput capability represented in the capability information.

SUMMARY

The present disclosure provides an information sending method, apparatus and storage medium.

According to a first aspect of the present disclosure, an information sending method is provided. The method is implemented in a terminal and comprises: establishing a connection with a base station; and during establishing the connection with the base station, sending terminal capability information to the base station for connecting the terminal to a mobile data network in accordance with the terminal capability information, wherein the terminal capability information comprises at least one field representing terminal capability comprising data throughput capability and at least one of latency capability, power consumption capability, reliability capability, enhanced Mobile Broadband (eMBB) capability, massive Machine-Type Communication (mMTC) capability and Ultra Reliable and Low Latency Communication (URLLC) capability.

According to a second aspect of the present disclosure, an information sending apparatus is provided. The apparatus comprises: a processor; and a memory storing instructions executable by the processor. The processor is configured to: establish a connection with a base station; and during establishing the connection with the base station, send terminal capability information to the base station for connecting the terminal to a mobile data network in accordance with the terminal capability information, wherein the terminal capability information comprises at least one field representing terminal capability comprising data throughput capability and at least one of latency capability, power consumption capability, reliability capability, enhanced Mobile Broadband (eMBB) capability, massive Machine-Type Communication (mMTC) capability and Ultra Reliable and Low Latency Communication (URLLC) capability.

According to a third aspect of the embodiments of the present disclosure, there is provided a non-transitory computer-readable storage medium having stored therein instructions that, when executed by a processor of a mobile terminal, cause the mobile terminal to perform an information sending method, the method comprising: establishing a connection with a base station; and during establishing the connection with the base station, sending terminal capability information to the base station for connecting the terminal to a mobile data network in accordance with the terminal capability information, wherein the terminal capability information comprises at least one field representing terminal capability comprising data throughput capability and at least one of latency capability, power consumption capability, reliability capability, enhanced Mobile Broadband (eMBB) capability, massive Machine-Type Communication (mMTC) capability and Ultra Reliable and Low Latency Communication (URLLC) capability.

BRIEF DESCRIPTION OF THE DRAWINGS

In order to better illustrate technical solutions provided by embodiments of the present disclosure, a brief introduction will be given hereinafter to the accompany drawings referred to in the description of the embodiments. Apparently, the drawings referred to in the description below are merely for illustrating some embodiments of the present disclosure, and other drawings may be envisaged by those skilled in the art based on these drawings without making any creative effort.

DETAILED DESCRIPTION

Reference will now be made in detail to exemplary embodiments, examples of which are illustrated in the accompanying drawings. The following description refers to the accompanying drawings in which the same numbers in different figures represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1:
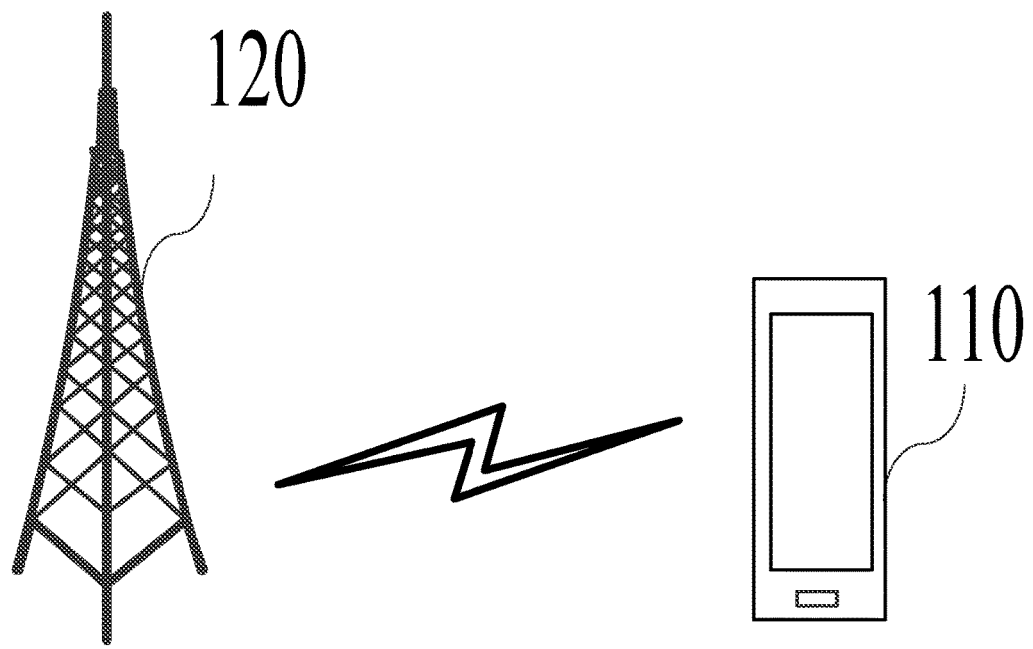
FIG. 1 is a schematic diagram illustrating a structure of an information transceiving system according to an embodiment of the present disclosure.

FIG. 1 is a schematic diagram illustrating a structure of an information transceiving system according to an exemplary embodiment of the present disclosure. The information transceiving system includes a terminal 110 and a base station 120.

The terminal 110 is capable of transmitting data. The terminal 110 is a terminal device in a mobile telecommunication system. The terminal 110 may be a mobile station, a mobile, a user terminal, a user device, or a user equipment (UE). For example, it may be a mobile phone, a tablet computer, a smart appliance, etc.

The base station 120 is capable of transmitting data. The base station 120 is an access network device in a mobile telecommunication system. For example, the access network device is a base transceiver station (BTS) in a Global System for Mobile communication (GSM) or a Code Division Multiple Access (CDMA) system. Alternatively, the access network device is a NodeB in a Universal Mobile Telecommunications System (UMTS). Alternatively, the access network device is an evolutional Node B (eNB or e-NodeB) in a LTE (Long Term Evolution) system. Alternatively, the access network device is a base station in a 5G (5th-Generation) system.

After establishing a connection with the base station 120, the terminal 110 will access a mobile data network provided by the base station 120. The terminal 110 communicates with the base station 120 via wireless carriers.

As shown in FIG. 1, the information transceiving system may include multiple terminals 110 and/or multiple base stations 120. Each terminal 110 may communicates with multiple base stations 120. In FIG. 1, one terminal 110 and one base station 120 are illustrated only by way of example. However, the numbers of the terminals and/or base stations are not limited in the embodiment.

Figure 2:
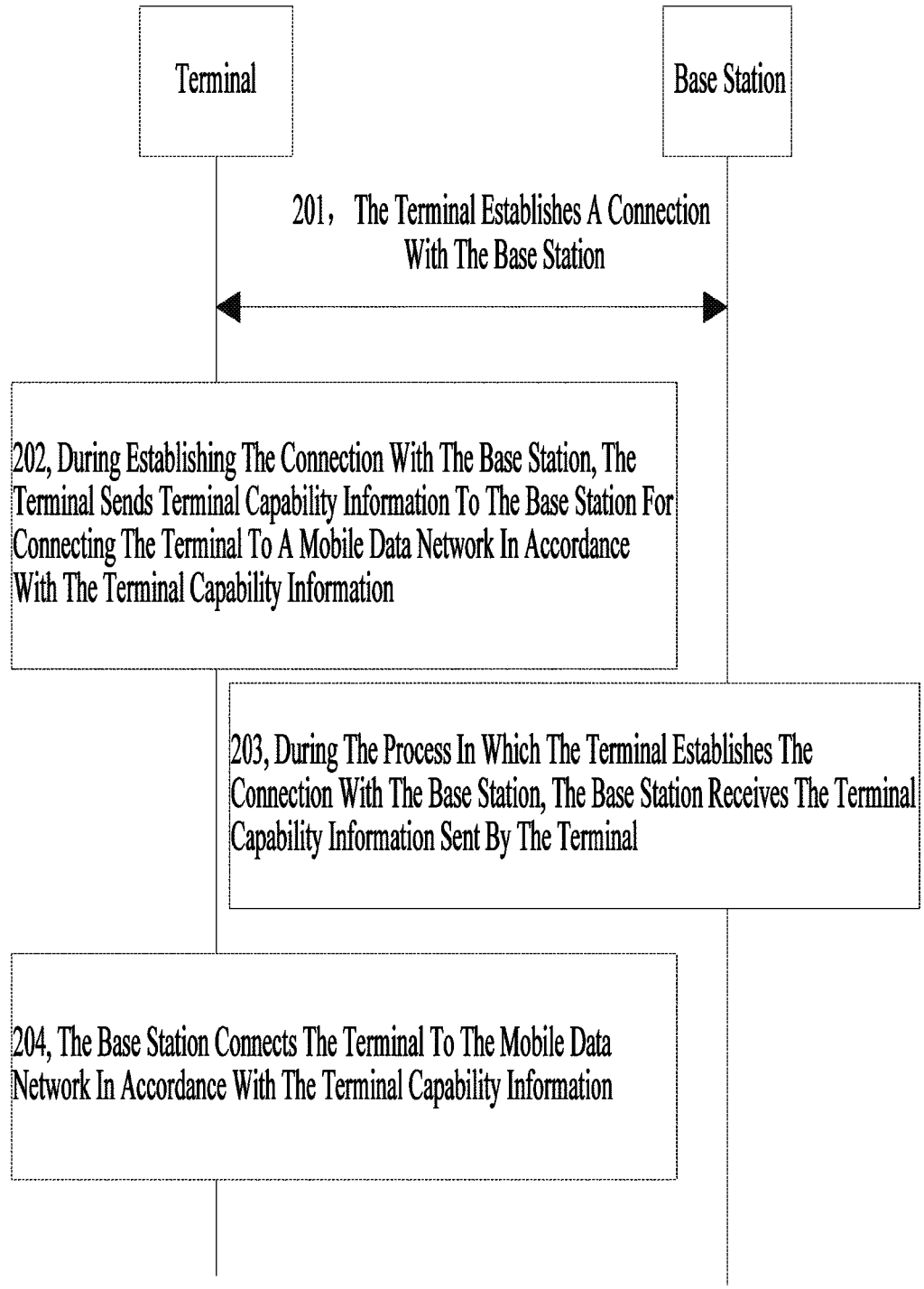
FIG. 2 is a flowchart illustrating an information transceiving method according to an embodiment of the present disclosure.

FIG. 2 is a flowchart illustrating an information transceiving method according to an exemplary embodiment of the present disclosure. The information transceiving method may be implemented in the information transceiving system as illustrated in FIG. 1. As shown in FIG. 2, the information transceiving method may comprise the following steps 201-204.

At step 201, a terminal establishes a connection with a base station.

At step 202, during establishing the connection with the base station, the terminal sends terminal capability information to the base station, so that the base station connects the terminal to a mobile data network in accordance with the terminal capability information.

The terminal capability information includes at least one field representing a terminal capability. The terminal capability includes data throughput capability and at least one of latency capability, power consumption capability, reliability capability, Enhanced Mobile Broadband (eMBB) capability, Massive Machine Type Communication (mMTC) capability and Ultra Reliable and Low Latency Communication (URLLC) capability.

The latency capability, the power consumption capability, the reliability capability and the data throughput capability are classes classified in terms of technical indicators, while the eMBB capability, the mMTC capability and the URLLC capability are classes classified in terms of types of services.

When the terminal sends a terminal capability to the base station, besides the data throughput capability of the terminal, it also sends to the base station at least one of the latency capability, the power consumption capability, the reliability capability, the eMBB capability, the mMTC capability and the URLLC capability.

In some embodiments, the terminal capability may further include an error resistance capability.

At step 203, during the process in which the terminal establishes the connection with the base station, the base station receives the terminal capability information sent by the terminal.

At step 204, the base station connects the terminal to a mobile data network in accordance with the terminal capability information.

It is to be noted that the steps 202 to 204 are performed during the step 201.

It is to be noted that the above steps 201 and 202 may be implemented as a separate method embodiment on the terminal side, and that the steps 201, 203 and 204 may be implemented as a separate method embodiment on the base station side.

In summary, according to the information transceiving method provided by the embodiment of the present disclosure, during a process in which a terminal establishes a connection with a base station, the terminal sends to the base station terminal capability information which can represent multiple types of terminal capability, thereby avoiding that when reporting its terminal capability, a terminal reports only data throughput capability of the terminal, and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

In the next embodiment, the terminal capability includes the data throughput capability, the latency capability, the power consumption capability, the reliability capability, the eMBB capability, the mMTC capability and the URLLC capability. A further description will be made for the embodiment.

Figure 3:
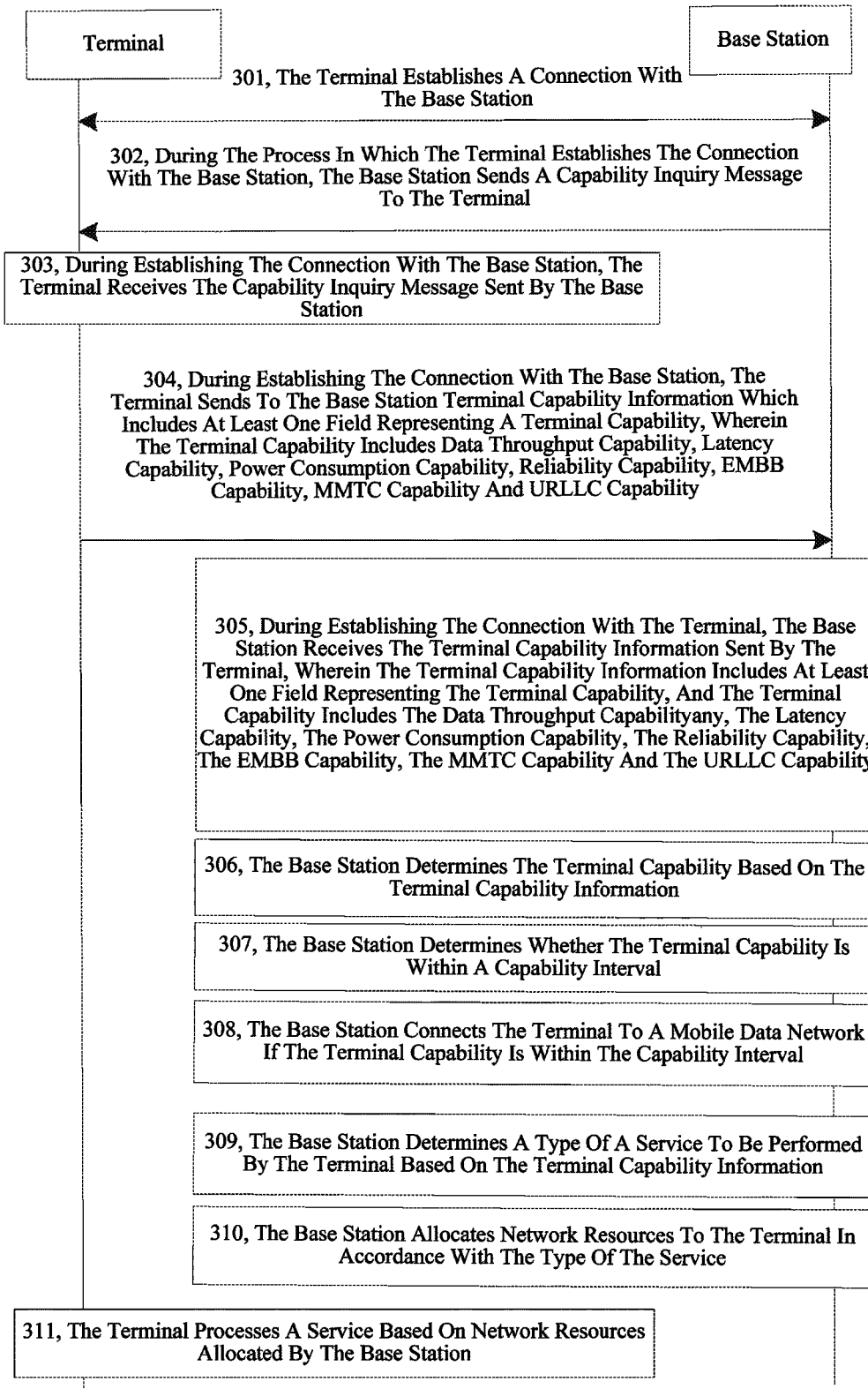
FIG. 3 is a flowchart illustrating an information transceiving method according to another embodiment of the present disclosure.

FIG. 3 is a flowchart illustrating an information transceiving method according to another exemplary embodiment of the present disclosure. The information transceiving method is implemented in the information transceiving system illustrated in FIG. 1. As shown in FIG. 3, the information transceiving method may comprise the following steps 301-311.

At step 301, a terminal establishes a connection with a base station.

At step 302, during the process in which the terminal establishes the connection with the base station, the base station sends a capability inquiry message to the terminal. The capability inquiry message instructs the terminal to send terminal capability information.

It is to be noted that the base station may not send the capability inquiry message to the terminal. In other words, this step may not be performed. When performed, this step should be performed during step 301.

At step 303, during establishing the connection with the base station, the terminal receives the capability inquiry message sent by the base station.

For example, when powered on, the terminal receives the capability inquiry message sent by the base station.

It is to be noted that this step should be performed during the step 301. However, this step may not be performed. That is, the base station does not send the capability inquiry message and the terminal does not receive the capability inquiry message. In other words, the step 304 will be performed directly without execution of steps 302 and 303.

At step 304, during establishing the connection with the base station, the terminal sends to the base station terminal capability information which includes at least one field representing a terminal capability. The terminal capability includes data throughput capability, latency capability, power consumption capability, reliability capability, eMBB capability, mMTC capability and URLLC capability.

The terminal capability information includes a data throughput capability field representing the data throughput capability of the terminal, a latency capability field representing the latency capability of the terminal, a power consumption capability field representing the power consumption capability of the terminal, a reliability capability field representing the reliability capability of the terminal, an eMBB capability field representing the eMBB capability of the terminal, an mMTC capability field representing the mMTC capability of the terminal and a URLLC capability field representing the URLLC capability of the terminal.

The data throughput capability field is composed of K bits and K is an integer greater than or equal to 1. That is, the data throughput capability of the terminal is represented by K bits.

For instance, the data throughput capability field is composed of 3 bits. That is, the data throughput capability of the terminal is represented by 3 bits. Relationships between values of the 3 bits and data throughput capabilities of terminals are illustrated in Table 1.

TABLE 1

| Values of bits | Data throughput capability |
| --- | --- |
| 001 | data throughput capability is at level 1 |
| 010 | data throughput capability is at level 2 |
| 011 | data throughput capability is at level 3 |
| 100 | data throughput capability is at level 4 |
| 101 | data throughput capability is at level 5 |
| . . . | . . . |

The latency capability field is composed of X bits and X is an integer greater than or equal to 1. That is, the latency capability of the terminal is represented by X bits.

For instance, the latency capability field is composed of 4 bits. That is, the latency capability of the terminal is represented by 4 bits. Relationships between values of the 4 bits and latency capabilities of terminals are illustrated in Table 2.

TABLE 2

| Values of bits | Latency capability |
| --- | --- |
| 0001 | latency capability is at level 1 |
| 0010 | latency capability is at level 2 |
| 0011 | latency capability is at level 3 |
| 0100 | latency capability is at level 4 |
| 0101 | latency capability is at level 5 |
| 0110 | latency capability is at level 6 |
| . . . | . . . |

The power consumption capability field is composed of Y bits and Y is an integer greater than or equal to 1. That is, the power consumption capability of the terminal is represented by Y bits.

For instance, the power consumption capability field is composed of 2 bits. That is, the power consumption capability of the terminal is represented by 2 bits. Relationships between values of the 2 bits and power consumption capabilities of terminals are illustrated in Table 3.

TABLE 3

| Value of bits | Power consumption capability |
| --- | --- |
| 01 | power consumption capability is at level 1 |
| 10 | power consumption capability is at level 2 |
| 11 | power consumption capability is at level 3 |

The reliability capability field is composed of Z bits and Z is an integer greater than or equal to 1. That is, the reliability capability of the terminal is represented by Z bits.

For instance, the reliability capability field is composed of 3 bits. That is, the reliability capability of the terminal is represented by 3 bits. Relationships between values of the 3 bits and reliability capabilities of terminals are illustrated in Table 4.

TABLE 4

| Values of bits | Reliability capability |
| --- | --- |
| 001 | reliability capability is at level 1 |
| 010 | reliability capability is at level 2 |
| 011 | reliability capability is at level 3 |
| 100 | reliability capability is at level 4 |
| . . . | . . . |

The eMBB capability field is composed of M bits and M is an integer greater than or equal to 1. That is, the eMBB capability of the terminal is represented by M bits.

For instance, the eMBB capability field is composed of 3 bits. That is, the eMBB capability of the terminal is represented by 3 bits. Relationships between values of the 3 bits and eMBB capabilities of terminals are illustrated in Table 5.

TABLE 5

| Values of bits | eMBB capability |
| --- | --- |
| 001 | eMBB capability is at level 1 |
| 010 | eMBB capability is at level 2 |
| 011 | eMBB capability is at level 3 |
| 100 | eMBB capability is at level 4 |
| . . . | . . . |

The mMTC capability field is composed of N bits and N is an integer greater than or equal to 1. That is, the mMTC capability of the terminal is represented by N bits.

For instance, the mMTC capability field is composed of 2 bits. That is, the mMTC capability of the terminal is represented by 2 bits. Relationships between values of the 2 bits and mMTC capabilities of terminals are illustrated in Table 6.

TABLE 6

| Values of bits | mMTC capability |
|---|---|
| 01 | mMTC capability is at level 1 |
| 10 | mMTC capability is at level 2 |
| 11 | mMTC capability is at level 3 |

The URLLC capability field is composed of A bits and A is an integer greater than or equal to 1. That is, the URLLC capability of the terminal is represented by A bits.

For instance, the URLLC capability field is composed of 4 bits. That is, the URLLC capability of the terminal is represented by 4 bits. Relationships between values of the 4 bits and URLLC capabilities of terminals are illustrated in Table 7.

TABLE 7

| value of bit | URLLC capability |
|---|---|
| 0001 | URLLC capability is at level 1 |
| 0010 | URLLC capability is at level 2 |
| 0011 | URLLC capability is at level 3 |
| 0100 | URLLC capability is at level 4 |
| 0101 | URLLC capability is at level 5 |
| 0110 | URLLC capability is at level 6 |
| ... | ... |

At step 305, during establishing the connection with the terminal, the base station receives the terminal capability information sent by the terminal. The terminal capability information includes at least one field representing a terminal capability, and the terminal capability includes the data throughput capability, the latency capability, the power consumption capability, the reliability capability, the eMBB capability, the mMTC capability and the URLLC capability.

At step 306, the base station determines the terminal capability based on the terminal capability information.

The base station analyzes the received terminal capability information to determine the terminal capability of the terminal.

At step 307, the base station determines whether the terminal capability is within a capability interval.

Endpoints of the capability interval are respectively a minimum capability and a maximum capability of the terminal supported by the mobile data network.

For instance, the base station determines that the level of the latency capability of the terminal is 3, based on the terminal capability information sent by the terminal. If the level of the minimum latency capability supported by the mobile data network is 2 and the level of the maximum latency capability supported by the mobile data network is 4, then the capability interval is [3, 4]. Accordingly, the base station determines whether the latency capability of the terminal is within the capability interval [3, 4].

If the terminal capability is within the capability interval, the base station connects the terminal to the mobile data network, i.e, step 308 is performed. If the terminal capability is not within the capability interval, the base station rejects the connection from the terminal and does not connect the terminal to the mobile data network.

At step 308, the base station connects the terminal to the mobile data network if the terminal capability is within the capability interval.

It is to be noted that the steps 302 to 308 are performed during the step 301.

At step 309, the base station determines a type of a service to be performed by the terminal based on the terminal capability information.

The base station analyzes the terminal capability information so as to determine the terminal capability, and determines a type of a service to be performed by the terminal based on the terminal capability. For instance, after analyzing the terminal capability information, the base station determines that the level of the latency capability of the terminal is 1 and that the level of the URLLC is 5, so the service to be performed by the terminal can be determined as a livecast service.

At step 310, the base station allocates network resources to the terminal in accordance with the type of the service.

In accordance with the type of the service to be performed by the terminal, the base station allocates network resources corresponding to the type of the service to the terminal.

For instance, if the type of the service to be performed by the terminal is a livecast service type, the base station allocates network resources corresponding to the livecast service to the terminal.

At step 311, the terminal processes a service based on network resources allocated by the base station.

When the terminal capability changes, the terminal will send updated terminal capability information to the base station.

For example, the terminal capability information sent by the terminal last time indicates that the level of the data throughput capability of the terminal is 2 and the level of the URLLC capability is 4. If the terminal capability changes such that the level of the data throughput capability becomes 6, the level of the URLLC capability becomes 1 and the power consumption capability becomes level 2 from nil, then the terminal will send updated terminal capability information to the base station.

In one implementation, after a terminal establishes a connection with a base station, the terminal will send updated terminal capability information to the base station when the terminal capability changes.

For instance, when the terminal establishes the connection with the base station, the terminal capability sent to the base station is a terminal capability corresponding to a video livecast service, and the network resources allocated from the base station to the terminal are network resources corresponding to the video livecast service. When a user processes a vehicular networking service by using the terminal, and the terminal capability changes (for example, the terminal requires a lower latency), then the terminal will send updated terminal capability information to the base station. Accordingly, the base station allocates network resources corresponding to the vehicular networking service to the terminal, in accordance with the updated terminal capability information sent by the terminal.

In another implementation, during establishing the connection with the base station, the terminal sends updated terminal capability information to the base station when the terminal capability changes.

For instance, if some programs in the terminal are upgraded during a process in which the terminal establishes a connection with the base station so that the terminal capability changes, then the terminal will send updated terminal capability information to the base station.

Accordingly, the base station receives the updated terminal capability information sent by the terminal.

The base station determines the type of the new service to be performed by the terminal based on the received updated terminal capability information, and allocates network resources corresponding to the type of the new service to the terminal.

It is to be noted that the above steps 301, 303, 304 and 311 may be implemented as a separate method embodiment on the terminal side, and that the steps 302 and 305 to 310 may be implemented as a separate method embodiment on the base station side.

In summary, according to the information transceiving method provided by the embodiment of the present disclosure, during a process in which a terminal establishes a connection with a base station, the terminal sends to the base station terminal capability information which can represent multiple types of terminal capability, thereby avoiding that when reporting its terminal capability, a terminal reports only a data throughput capability of the terminal and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

Furthermore, when the terminal capability changes, the terminal will send updated terminal capability information to the base station and the base station can timely adjust the network resources to be allocated to the terminal in accordance with the updated terminal capability information sent by the terminal, so that proper processing of different types of services can be ensured when the terminal switches among different types of services during its actual use.

In an embodiment based on the embodiment illustrated in FIG. 3, the terminal capability includes the data throughput capability and any one of the latency capability, the power consumption capability, the reliability capability, the eMBB capability, the mMTC capability and the URLLC capability. A further description will be made for the embodiment.

Figure 4:
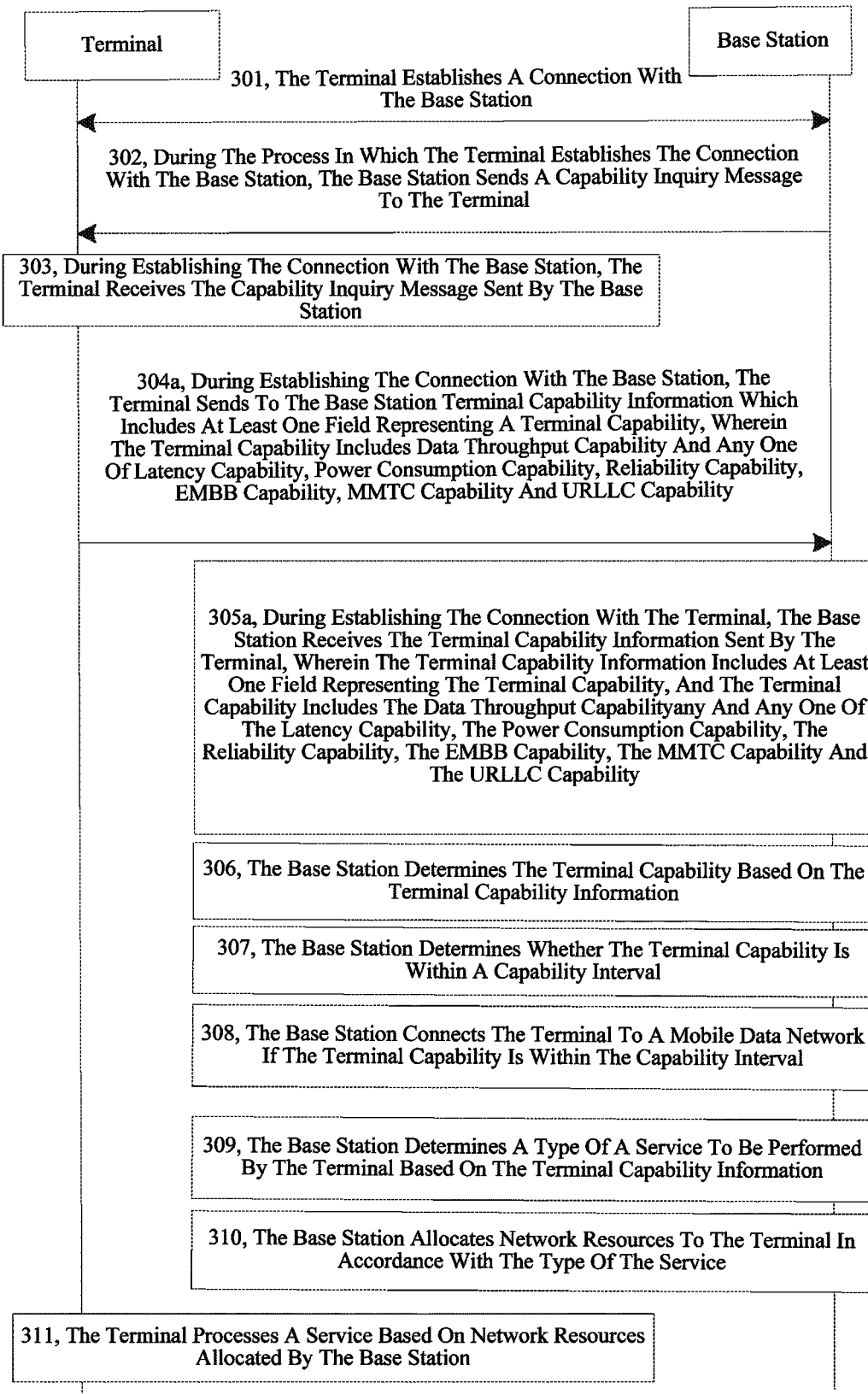
FIG. 4 is a flowchart illustrating an information transceiving method according to yet another embodiment of the present disclosure.

If the terminal capability includes the data throughput capability and any one of the latency capability, the power consumption capability, the reliability capability, the eMBB capability, the mMTC capability and the URLLC capability, the above step 304 may be replaced by a step 304a and the step 305 may be replaced by a step 305a, as shown in FIG. 4.

At step 304a, during establishing the connection with the base station, the terminal sends to the base station terminal capability information which includes at least one field representing a terminal capability. The terminal capability includes the data throughput capability and any one of the latency capability, the power consumption capability, the reliability capability, the eMBB capability, the mMTC capability and the URLLC capability.

The terminal capability includes the throughput capability and any one of the latency capability, the power consumption capability and the reliability capability, or the terminal capability includes the data throughput capability and any one of the eMBB capability, the mMTC capability and the URLLC capability.

In other words, the terminal capability includes data throughput capability and latency capability, or the terminal capability includes data throughput capability and power consumption capability, or the terminal capability includes data throughput capability and reliability capability, or the terminal capability includes data throughput capability and mMTC capability, or the terminal capability includes data throughput capability and eMBB capability, or the terminal capability includes data throughput capability and URLLC capability.

Detailed implementation of the step is similar to that of the step 304, and will not be described here redundantly.

At step 305a, during establishing the connection with the terminal, the base station receives the terminal capability information sent by the terminal. The terminal capability information includes at least one field representing the terminal capability. The terminal capability includes the data throughput capability and any one of the latency capability, the power consumption capability, the reliability capability, the eMBB capability, the mMTC capability and the URLLC capability.

In an embodiment based on the embodiment illustrated in FIG. 3, the terminal capability includes the data throughput capability and any two of the latency capability, the power consumption capability, the reliability capability, the eMBB capability, the mMTC capability and URLLC capability. A further description will be made for the embodiment of the disclosure.

Figure 5A:
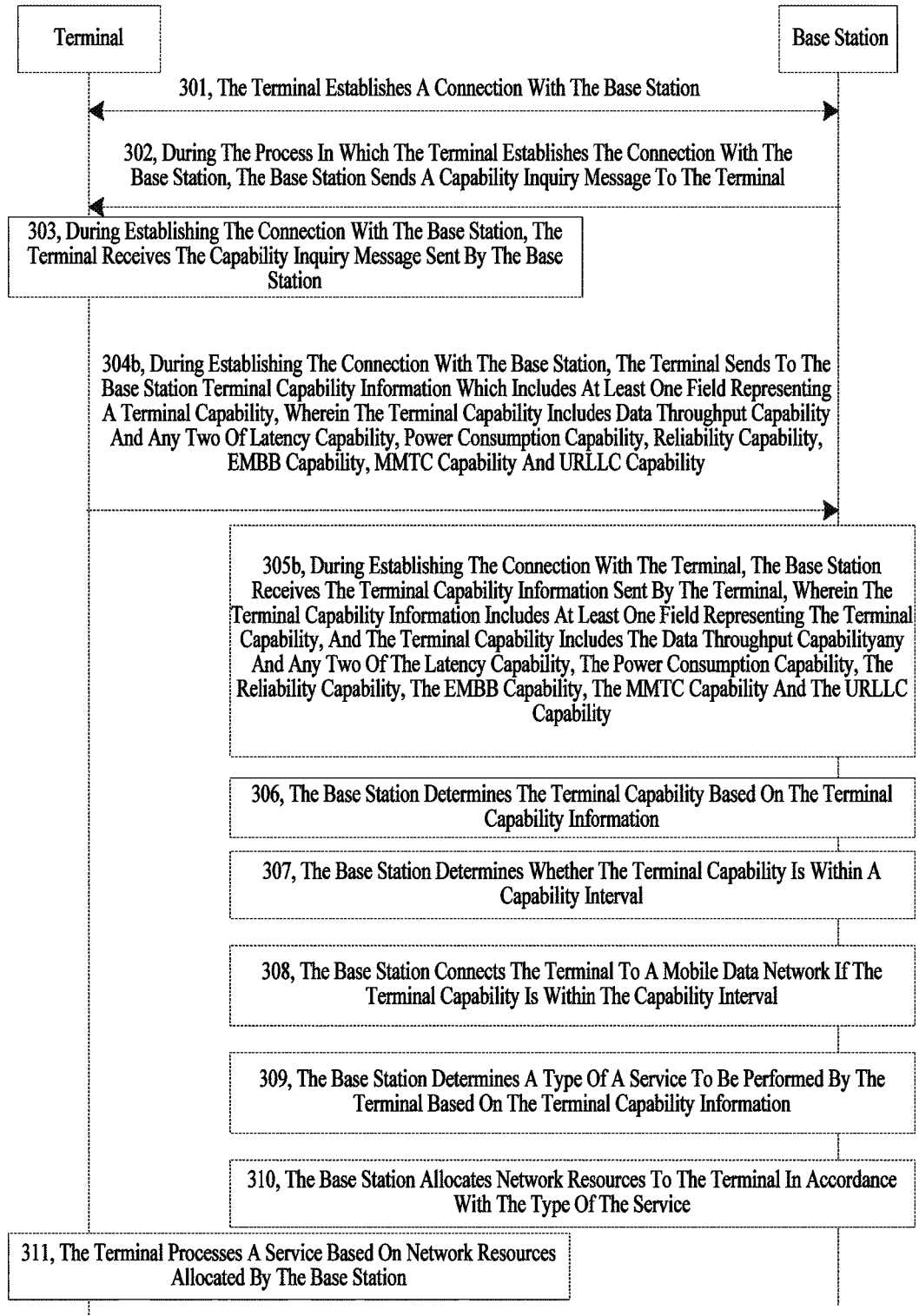
FIG. 5A is a flowchart illustrating an information sending method according to still another embodiment of the present disclosure.

If the terminal capability includes the data throughput capability and any two of the latency capability, the power consumption capability, the reliability capability, the eMBB capability, the mMTC capability and the URLLC capability, the above step 304 may be replaced by a step 304b and the step 305 may be replaced by a step 305b, as shown in FIG. 5A.

At step 304b, during establishing the connection with the base station, the terminal sends to the base station terminal capability information which includes at least one field representing a terminal capability. The terminal capability includes data throughput capability and any two of latency capability, power consumption capability, reliability capability, eMBB capability, mMTC capability and URLLC capability.

Detailed implementation of the step is similar to that of the step 303, and will not be described here redundantly.

At step 305b, during establishing the connection with the terminal, the base station receives the terminal capability information sent by the terminal. The terminal capability information includes at least one field representing the terminal capability. The terminal capability includes the data throughput capability and any two of the latency capability, the power consumption capability, the reliability capability, the eMBB capability, the mMTC capability and the URLLC capability.

In an embodiment based on the embodiment illustrated in FIG. 3, the terminal capability includes the data throughput capability and any three of the latency capability, the power consumption capability, the reliability capability, the eMBB capability, the mMTC capability and URLLC capability. A further description will be made for the embodiment of the disclosure.

Figure 5B:
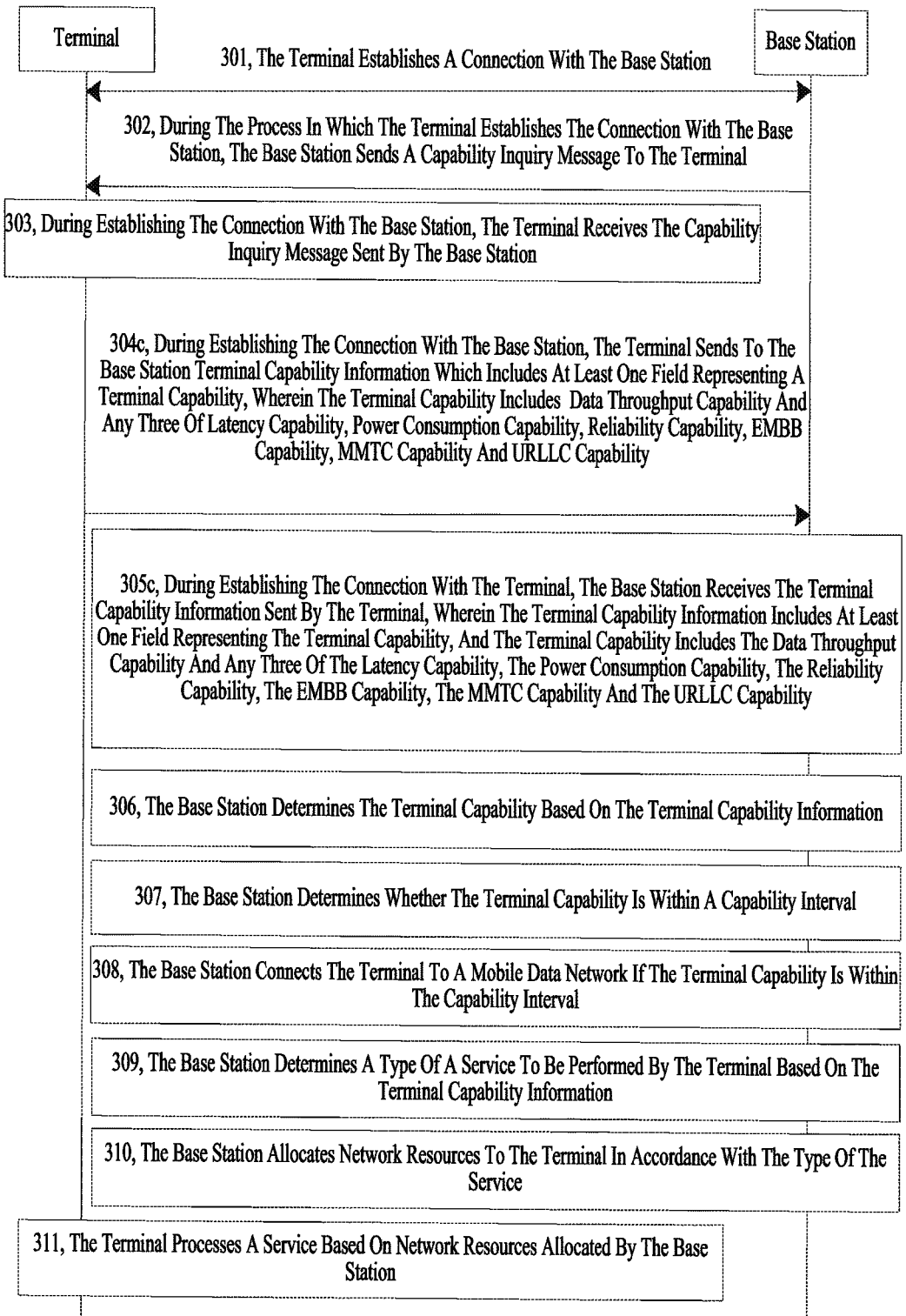
FIG. 5B is a flowchart illustrating an information sending method according to a further embodiment of the present disclosure.

If the terminal capability includes the data throughput capability and any three of the latency capability, the power consumption capability, the reliability capability, the eMBB capability, the mMTC capability and the URLLC capability, the above step 304 may be replaced by a step 304c and the step 305 may be replaced by a step 305c, as shown in FIG. 5B.

At step 304c, during establishing the connection with the base station, the terminal sends to the base station terminal capability information which includes at least one field representing a terminal capability. The terminal capability includes data throughput capability and any three of latency capability, power consumption capability, reliability capability, eMBB capability, mMTC capability and URLLC capability.

Detailed implementation of the step is similar to the step 303, and will not be described here redundantly.

At step 305c, during establishing the connection with the terminal, the base station receives the terminal capability information sent by the terminal. The terminal capability information includes at least one field representing the terminal capability. The terminal capability includes the data throughput capability and any three of the latency capability, the power consumption capability, the reliability capability, the eMBB capability, the mMTC capability and the URLLC capability.

In an embodiment based on the embodiment illustrated in FIG. 3, the terminal capability includes the data throughput capability and any four of the latency capability, the power consumption capability, the reliability capability, the eMBB capability, the mMTC capability and URLLC capability. A further description will be made for the embodiment of the disclosure.

Figure 5C:
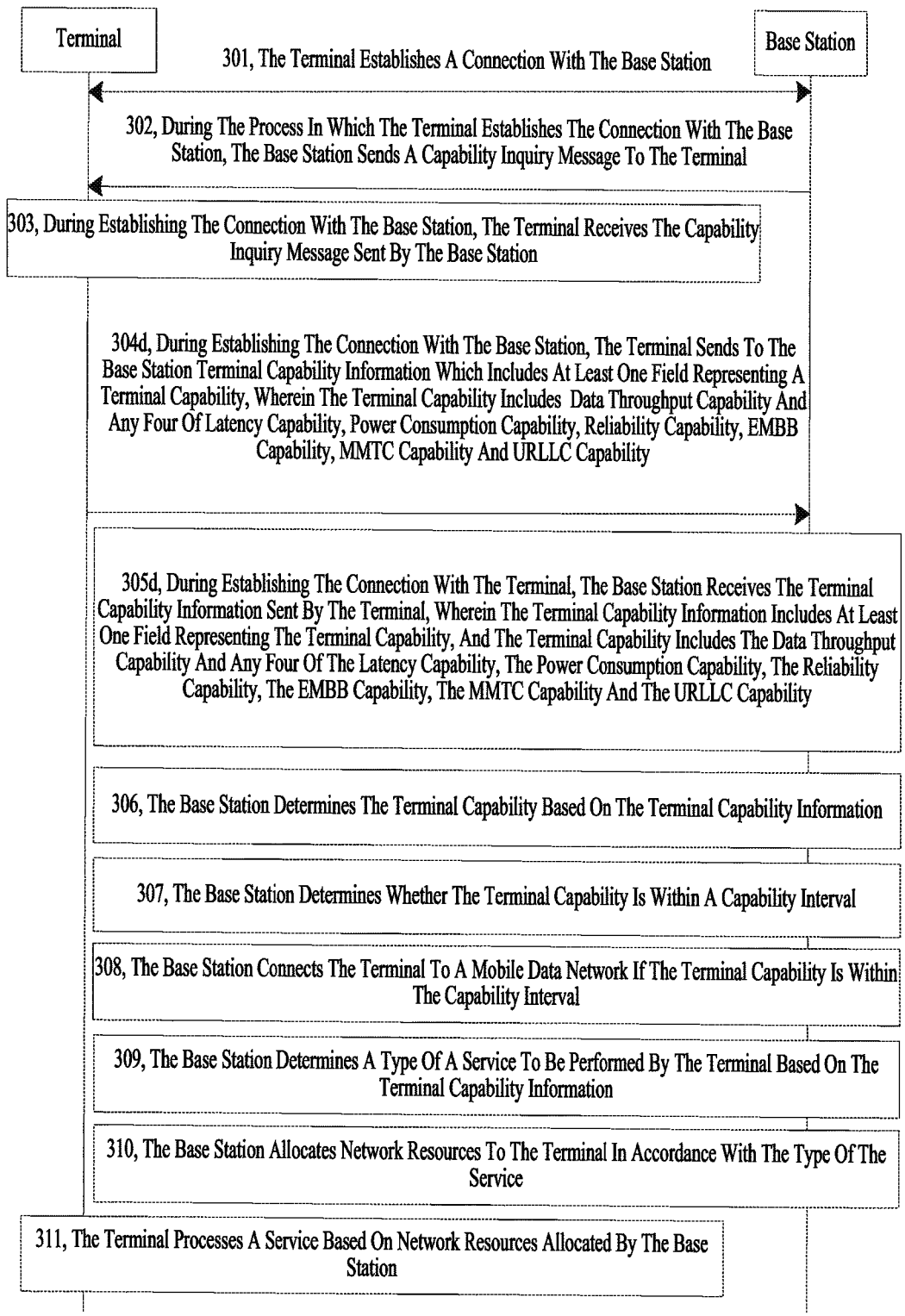
FIG. 5C is a flowchart illustrating an information sending method according to yet a further embodiment of the present disclosure.

If the terminal capability includes the data throughput capability and any four of the latency capability, the power consumption capability, the reliability capability, the eMBB capability, the mMTC capability and the URLLC capability, the above step 304 may be replaced by a step 304d and the step 305 may be replaced by a step 305d, as shown in FIG. 5C.

At step 304d, during establishing the connection with the base station, the terminal sends to the base station terminal capability information which includes at least one field representing a terminal capability. The terminal capability includes data throughput capability and any four of latency capability, power consumption capability, reliability capability, eMBB capability, mMTC capability and URLLC capability.

Detailed implementation of the step is similar to that of the step 303, and will not be described here redundantly.

At step 305d, during establishing the connection with the terminal, the base station receives the terminal capability information sent by the terminal, wherein the terminal capability information includes at least one field representing the terminal capability. The terminal capability includes the data throughput capability and any four of the latency capability, the power consumption capability, the reliability capability, the eMBB capability, the mMTC capability and the URLLC capability.

In an embodiment based on the embodiment illustrated in FIG. 3, the terminal capability includes the data throughput capability and any five of the latency capability, the power consumption capability, the reliability capability, the eMBB capability, the mMTC capability and URLLC capability. A further description will be made for the embodiment.

Figure 5D:
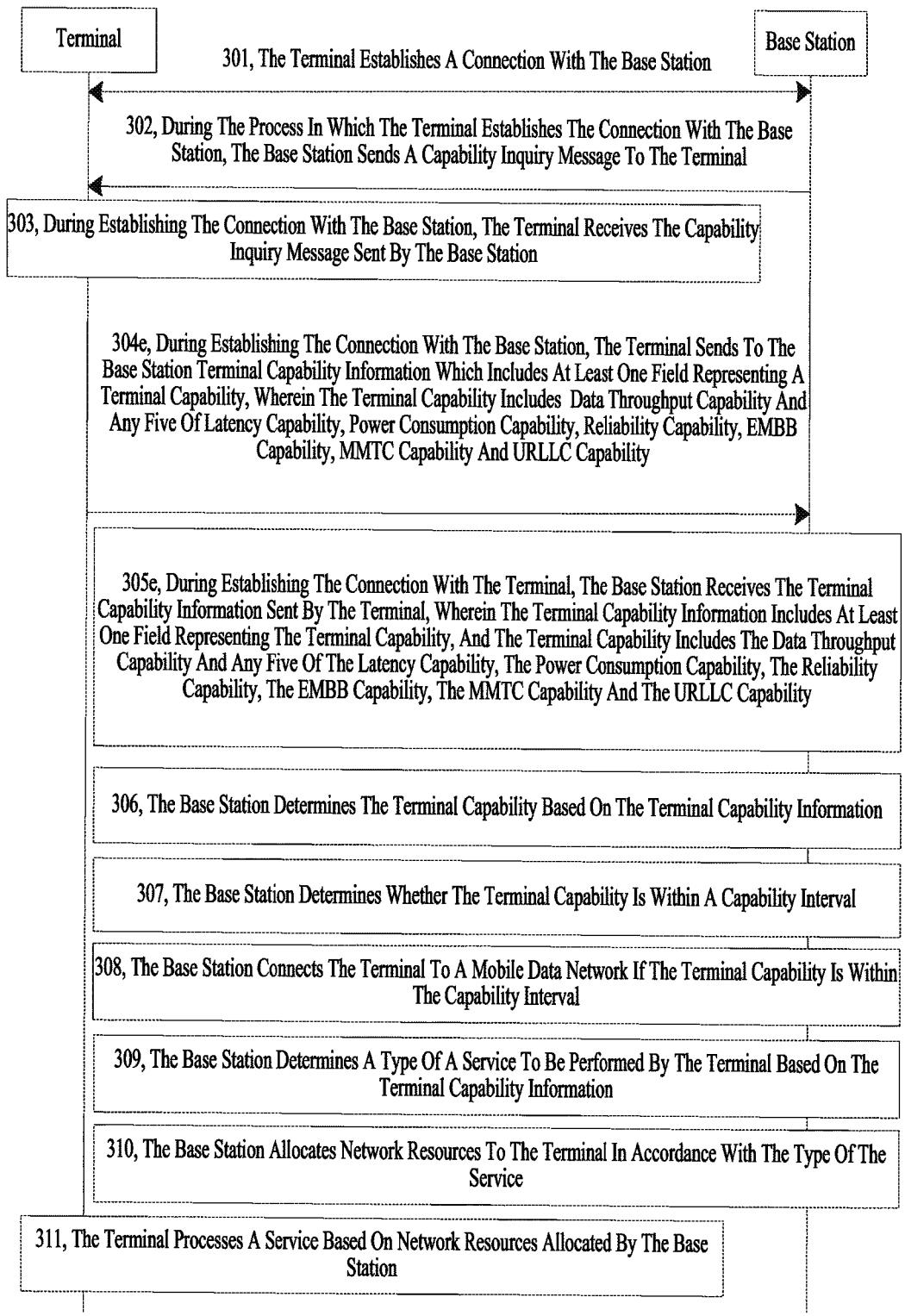
FIG. 5D is a flowchart illustrating an information sending method according to still a further embodiment of the present disclosure.

If the terminal capability includes the data throughput capability and any five of the latency capability, the power consumption capability, the reliability capability, the eMBB capability, the mMTC capability and the URLLC capability, the above step 304 may be replaced by a step 304e and the step 305 may be replaced by a step 305e, as shown in FIG. 5D.

At step 304e, during establishing the connection with the base station, the terminal sends to the base station terminal capability information which includes at least one field representing a terminal capability. The terminal capability includes data throughput capability and any five of latency capability, power consumption capability, reliability capability, eMBB capability, mMTC capability and URLLC capability.

Detailed implementation of the step is similar to that of the step 303, and will not be described here redundantly.

At step 305e, during establishing the connection with the terminal, the base station receives the terminal capability information sent by the terminal. The terminal capability information includes at least one field representing the terminal capability. The terminal capability includes the data throughput capability and any five of the latency capability, the power consumption capability, the reliability capability, the eMBB capability, the mMTC capability and the URLLC capability.

Figure 6:
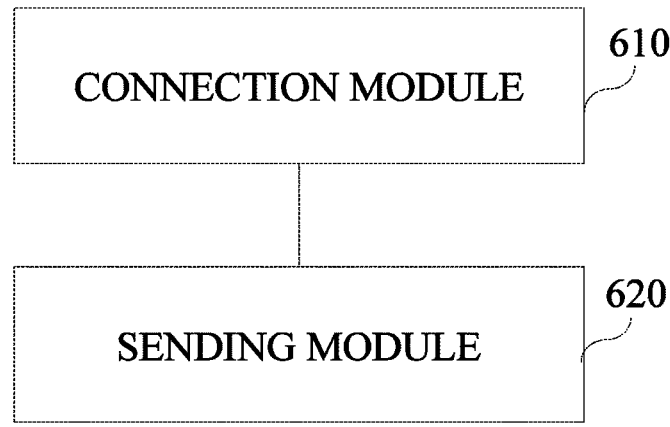
FIG. 6 is a block diagram illustrating a structure of an information sending apparatus according to an embodiment of the present disclosure.

FIG. 6 is a block diagram illustrating a structure of an information sending apparatus provided by an embodiment of the present disclosure. The information sending apparatus may be implemented, with software, hardware or a combination thereof, as the entirety or part of the above terminal which can implement the information transceiving method.

The apparatus comprises: a connection module 610 configured to establish a connection with a base station; and a sending module 620 configured to, during establishing the connection with the base station, send terminal capability information to the base station, and the terminal capability information includes at least one field representing terminal capability. The terminal capability includes data throughput capability and at least one of latency capability, power consumption capability, reliability capability, eMBB capability, mMTC capability and URLLC capability.

In summary, according to the information sending apparatus provided by the embodiment of the present disclosure, during a process in which a terminal establishes a connection with a base station, the terminal sends to the base station terminal capability information which can represent multiple types of terminal capability, thereby avoiding that when reporting its terminal capability, a terminal reports only a data throughput capability of the terminal and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

Figure 7:
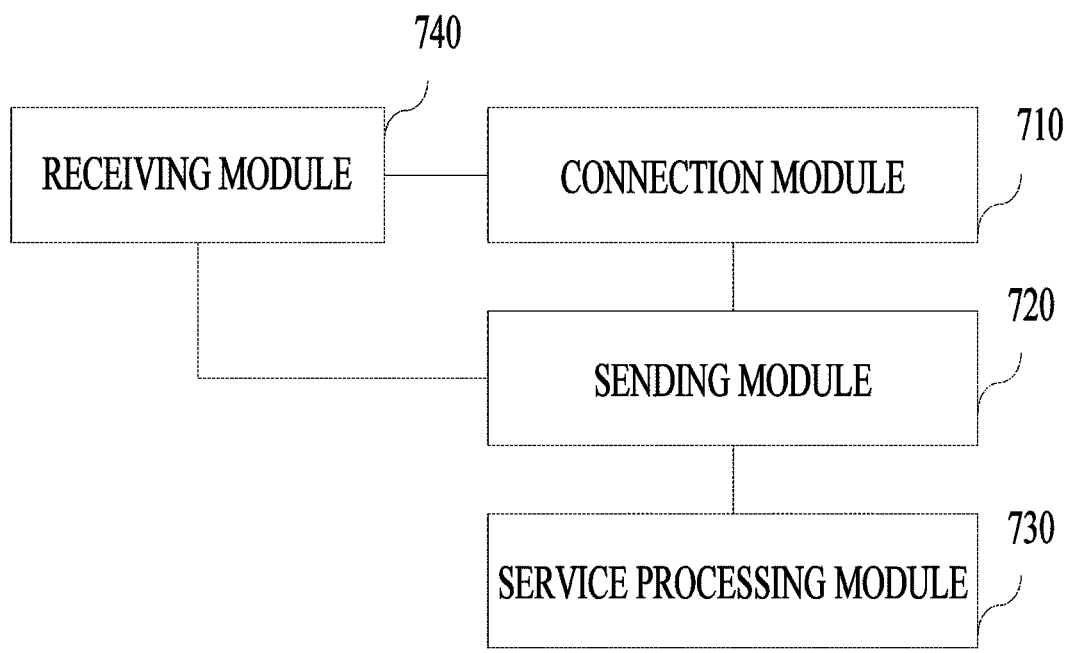
FIG. 7 is a block diagram illustrating a structure of an information receiving apparatus according to an embodiment of the present disclosure.

FIG. 7 is a block diagram illustrating a structure of an information sending apparatus according to another embodiment of the present disclosure. The information sending apparatus may be implemented, with software, hardware or a combination thereof, as the entirety or part of the above terminal which can implement the information transceiving method.

The apparatus comprises: a connection module 710 configured to establish a connection with a base station; and a sending module 720 configured to, during establishing the connection with the base station, send terminal capability information to the base station, and the terminal capability information includes at least one field representing terminal capability, so that the base station connects the terminal to a mobile data network in accordance with the terminal capability informat. The terminal capability includes data throughput capability and at least one of latency capability, power consumption capability, reliability capability, eMBB capability, mMTC capability and URLLC capability.

In some embodiments, when the terminal capability includes the latency capability, the terminal capability information includes a latency capability field representing the latency capability of the terminal, wherein the latency capability field is composed of X bits, and X is an integer greater than or equal to 1.

In some embodiments, when the terminal capability includes the power consumption capability, the terminal capability information includes a power consumption capability field representing the power consumption capability of the terminal, wherein the power consumption capability field is composed of Y bits, and Y is an integer greater than or equal to 1.

In some embodiments, when the terminal capability includes the reliability capability, the terminal capability information includes a reliability capability field representing the reliability capability of the terminal, wherein the reliability capability field is composed of Z bits, and Z is an integer greater than or equal to 1.

In some embodiments, when the terminal capability includes the eMBB capability, the terminal capability information includes an eMBB capability field representing the eMBB capability of the terminal, wherein the eMBB capability field is composed of M bits, and M is an integer greater than or equal to 1.

In some embodiments, when the terminal capability includes the mMTC capability, the terminal capability information includes an mMTC capability field representing the mMTC capability of the terminal, wherein the mMTC capability field is composed of N bits, and N is an integer greater than or equal to 1.

In some embodiments, when the terminal capability includes the URLLC capability, the terminal capability information includes a URLLC capability field representing the URLLC capability of the terminal, wherein the URLLC capability field is composed of A bits, and A is an integer greater than or equal to 1.

In some embodiments, the terminal capability information includes a data throughput capability field representing the data throughput capability of the terminal, wherein the data throughput capability field is composed of K bits, and K is an integer greater than or equal to 1.

In some embodiments, the sending module is further configured to send updated terminal capability information to the base station when the terminal capability changes.

In some embodiments, the apparatus further comprises: a service processing module 730 configured to process a service based on network resources allocated by the base station, wherein the base station determines a type of a service to be performed by the terminal based on the terminal capability information, and allocates network resources to the terminal in accordance with the type of the service.

In some embodiments, the apparatus further comprises: a receiving module 740 configured to, during establishing the connection with the base station, receive a capability inquiry message sent by the base station, wherein the capability inquiry message instructs the terminal to send the terminal capability information to the base station.

In some embodiments, the sending module 720 is configured to send the terminal capability information to the base station, so that the base station determines the terminal capability based on the terminal capability information, determines whether the terminal capability is within a capability interval, and connects the terminal to the mobile data network if the terminal capability is within the capability interval, wherein endpoints of the capability interval are respectively a minimum capability and a maximum capability of the terminal supported by the mobile data network.

In summary, according to the information sending apparatus provided by the embodiment of the present disclosure, during a process in which a terminal establishes a connection with a base station, the terminal sends to the base station terminal capability information which can represent multiple types of terminal capability, thereby avoiding that when reporting its terminal capability, a terminal reports only a data throughput capability of the terminal and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

Furthermore, when the terminal capability changes, the terminal will send updated terminal capability information to the base station and the base station can timely adjust the network resources to be allocated to the terminal in accordance with the updated terminal capability information sent by the terminal, so that proper processing of different types of services can be ensured when the terminal switches among different types of services during its actual use.

Figure 8:
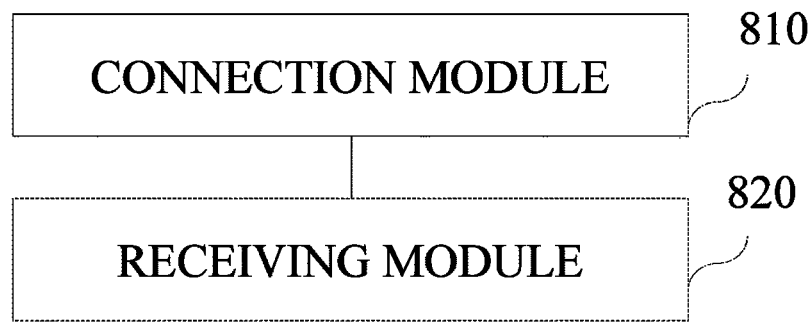
FIG. 8 is a block diagram illustrating a structure of an information receiving apparatus according to an embodiment of the present disclosure.

FIG. 8 is a block diagram illustrating a structure of an information receiving apparatus according to an embodiment of the present disclosure. The information receiving apparatus may be implemented, with software, hardware or a combination thereof, as the entirety or part of the above base station which can implement the information transceiving method.

The apparatus comprises: a connection module 810 configured to establish a connection with a terminal; and a receiving module 820 configured to, during establishing the connection with the terminal, receive terminal capability information sent by the terminal, wherein the terminal capability information includes at least one field representing a terminal capability. The terminal capability includes data throughput capability and at least one of latency capability, power consumption capability, reliability capability, eMBB capability, mMTC capability, and URLLC capability. The connection module 810 is further configured to connect the terminal to a mobile data network in accordance with the terminal capability information.

In summary, according to the information sending apparatus provided by the embodiment of the present disclosure, during a process in which a terminal establishes a connection with a base station, the terminal sends to the base station terminal capability information which can represent multiple types of terminal capability, thereby avoiding that when reporting its terminal capability, a terminal reports only a data throughput capability of the terminal and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

Figure 9:
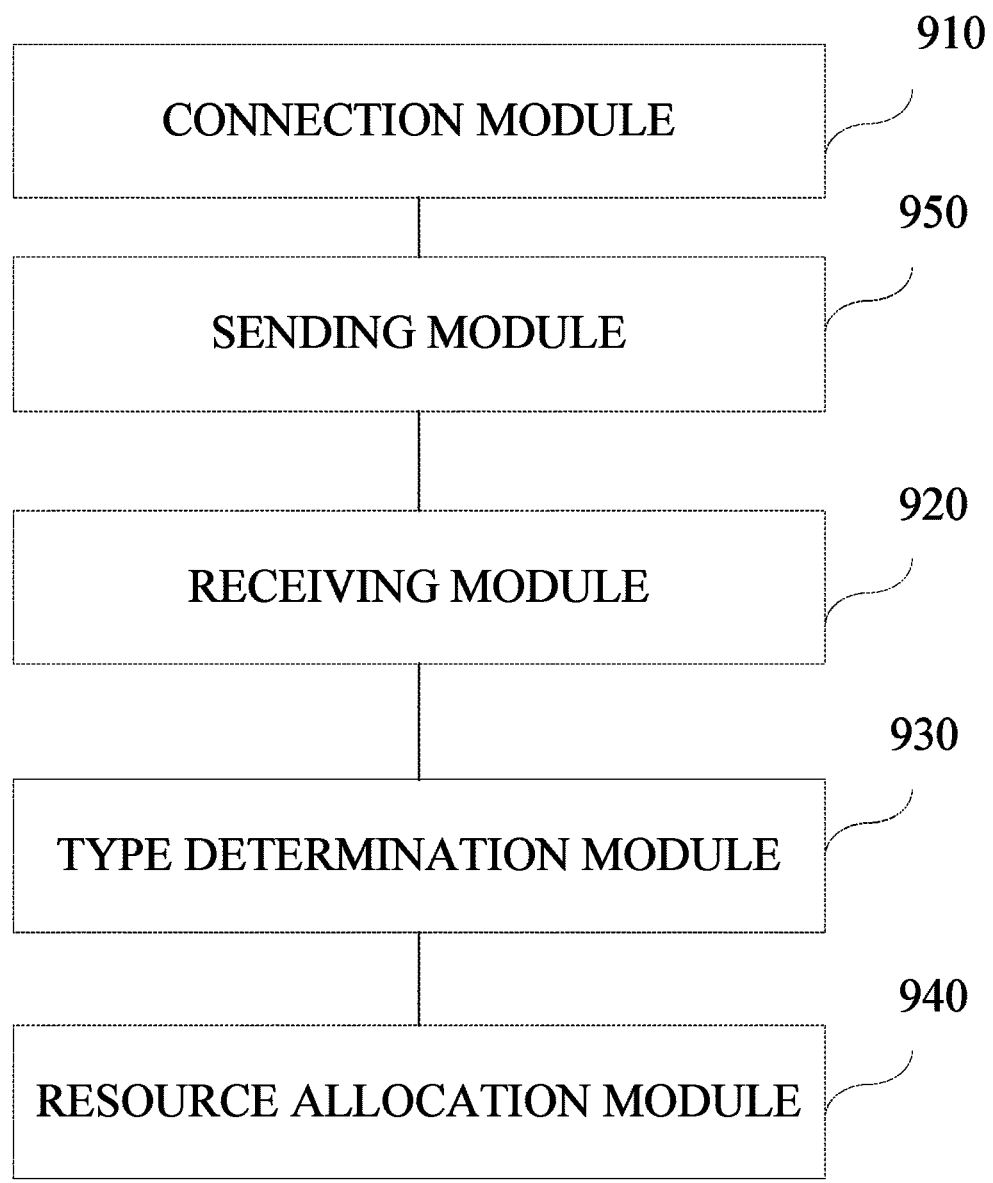
FIG. 9 is a block diagram illustrating a structure of an information receiving apparatus according to an embodiment of the present disclosure.

FIG. 9 is a block diagram illustrating a structure of an information receiving apparatus according to an embodiment of the present disclosure. The information receiving apparatus may be implemented, with software, hardware or a combination thereof, as the entirety or part of the above base station which can implement the information transceiving method.

The apparatus comprises: a connection module 910 configured to establish a connection with a terminal; and a receiving module 920 configured to, during establishing the connection with the terminal, receive terminal capability information sent by the terminal, wherein the terminal capability information includes at least one field representing a terminal capability. The terminal capability includes data throughput capability and at least one of latency capability, power consumption capability, reliability capability, eMBB capability, mMTC capability, and URLLC capability.

The connection module 910 is further configured to connect the terminal to a mobile data network in accordance with the terminal capability information.

In some embodiments, when the terminal capability includes the latency capability, the terminal capability information includes a latency capability field representing the latency capability of the terminal, wherein the latency capability field is composed of X bits, and X is an integer greater than or equal to 1.

In some embodiments, when the terminal capability includes the power consumption capability, the terminal capability information includes a power consumption capability field representing the power consumption capability of the terminal, wherein the power consumption capability field is composed of Y bits, and Y is an integer greater than or equal to 1.

In some embodiments, when the terminal capability includes the reliability capability, the terminal capability information includes a reliability capability field representing the reliability capability of the terminal, wherein the reliability capability field is composed of Z bits, and Z is an integer greater than or equal to 1.

In some embodiments, when the terminal capability includes the eMBB capability, the terminal capability information includes an eMBB capability field representing the eMBB capability of the terminal, wherein the eMBB capability field is composed of M bits, and M is an integer greater than or equal to 1.

In some embodiments, when the terminal capability includes the mMTC capability, the terminal capability information includes an mMTC capability field representing the mMTC capability of the terminal, wherein the mMTC capability field is composed of N bits, and N is an integer greater than or equal to 1.

In some embodiments, when the terminal capability includes the URLLC capability, the terminal capability information includes a URLLC capability field representing the URLLC capability of the terminal, wherein the URLLC capability field is composed of A bits, and A is an integer greater than or equal to 1.

In some embodiments, the terminal capability information includes a data throughput capability field representing the data throughput capability of the terminal, wherein the data throughput capability field is composed of K bits, and K is an integer greater than or equal to 1.

In some embodiments, the receiving module is further configured to receive updated terminal capability information sent by the terminal.

In some embodiments, the apparatus further comprises: a type determination module 930 configured to determine a type of a service to be performed by the terminal based on the terminal capability information; and a resource allocation module 940 configured to allocate network resources to the terminal in accordance with the type of the service.

In some embodiments, the apparatus further comprises: a sending module 950 configured to, during establishing the connection with the terminal, send a capability inquiry message to the terminal, wherein the capability inquiry message instructs the terminal to send the terminal capability information.

In some embodiments, the connection module 910 is configured to: determine the terminal capability based on the terminal capability information; determine whether the terminal capability is within a capability interval, wherein endpoints of the capability interval are respectively a minimum capability and a maximum capability of the terminal supported by the mobile data network; and connect the terminal to the mobile data network if the terminal capability is within the capability interval.

In summary, according to an information receiving apparatus provided by embodiments of the present disclosure, during a process in which a terminal establishes a connection with a base station, the terminal sends to the base station terminal capability information which can represent multiple types of terminal capability, thereby avoiding that when reporting its terminal capability, a terminal reports only a data throughput capability of the terminal and when allocating network resources, a base station can only perform the allocation according to the data throughput capability of the terminal but cannot allocate network resources corresponding to types of services. As such, the terminal capability sent by the terminal becomes more comprehensive, and the base station can allocate network resources corresponding to types of services to the terminal in accordance with various kinds of terminal capability sent by the terminal when allocating resources.

Furthermore, when the terminal capability changes, the terminal will send updated terminal capability information to the base station and the base station can timely adjust the network resources to be allocated to the terminal in accordance with the updated terminal capability information sent by the terminal, so that proper processing of different types of services can be ensured when the terminal switches among different types of services during its actual use.

One exemplary embodiment of the present disclosure provides an information sending apparatus which can implement an information transceiving method provided by the present disclosure. The information sending apparatus comprises: a processor; and a memory storing instructions executable by the processor. The processor is configured to: establish a connection with a base station; and during establishing the connection with the base station, send to the base station terminal capability information which includes at least one field representing a terminal capability, so that the base station connects the terminal to a mobile data network in accordance with the terminal capability informat. The terminal capability includes data throughput capability and at least one of latency capability, power consumption capability, reliability capability, eMBB capability, mMTC capability and URLLC capability.

One exemplary embodiment of the present disclosure provides an information receiving apparatus which can implement an information transceiving method provided by the present disclosure. The information receiving apparatus comprises: a processor; and a memory storing instructions executable by the processor. The processor is configured to: establish a connection with a terminal; during establishing the connection with the terminal, receive terminal capability information sent by the terminal, wherein the terminal capability information includes at least one field representing a terminal capability, and the terminal capability includes data throughput capability and at least one of latency capability, power consumption capability, reliability capability, eMBB capability, mMTC capability and URLLC capability; and connect the terminal to a mobile data network in accordance with the terminal capability information.

Figure 10:
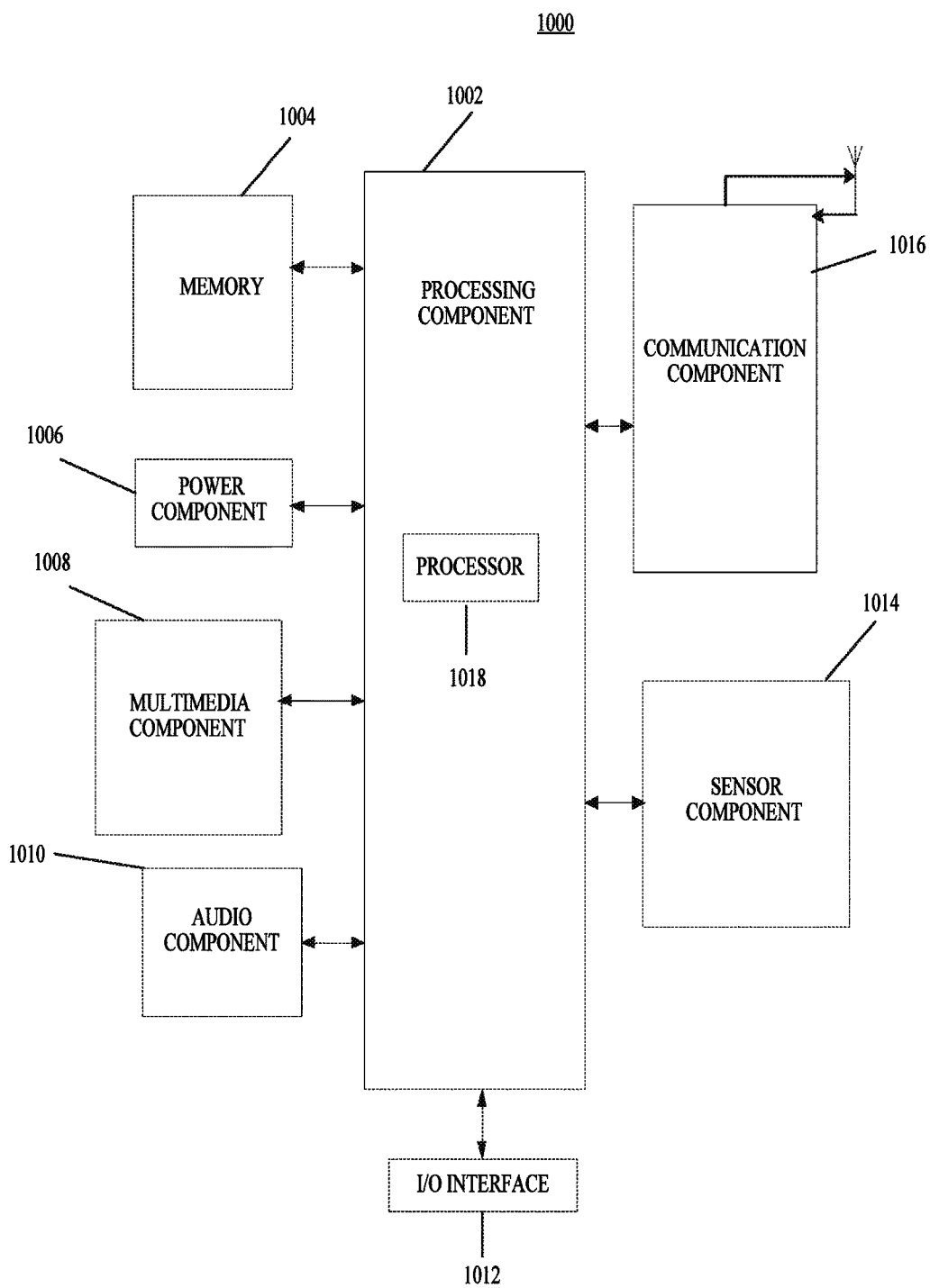
FIG. 10 is a block diagram illustrating a structure of an information sending apparatus according to an embodiment of the present disclosure.

FIG. 10 is a block diagram illustrating an information sending apparatus according to an exemplary embodiment. For example, the apparatus 1000 may be a mobile phone, a computer, a digital broadcast terminal, a messaging device, a gaming console, a tablet, a medical device, exercise equipment, a personal digital assistant or the like.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014 and a communication component 1016.

The processing component 1002 generally controls the overall operations of the apparatus 1000, for example, display, phone call, data communication, camera operation and recording operation. The processing component 1002 may include one or more processors 1018 to execute instructions to perform all or part of the steps in the above described methods. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation performed on the apparatus 1000. Examples of such data include instructions for any applications or methods operated on the apparatus 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power supply management system, one or more power sources, and any other components associated with the generation, management, and distribution of power in the apparatus 1000.

The multimedia component 1008 includes a screen providing an output interface between the apparatus 1000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive external multimedia data while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the apparatus 1000. For instance, the sensor component 1014 may detect an open/closed status of the apparatus 1000, relative positioning of components, e.g., the display and the keypad, of the apparatus 1000, a change in position of the apparatus 1000 or a component of the apparatus 1000, a presence or absence of user contact with the apparatus 1000, an orientation or an acceleration/deceleration of the apparatus 1000, and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor or a temperature sensor.

The communication component 1016 is configured to facilitate wired or wireless communication between the apparatus 1000 and other devices. The apparatus 1000 can access a wireless network based on a communication standard, such as WiFi, 2G; or 3G; or a combination thereof. In one exemplary embodiment, the communication component 1016 receives a broadcast signal or broadcast related information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1000 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above described methods.

In exemplary embodiments, there is also provided a non-transitory computer-readable storage medium including instructions, such as included in the memory 1004, executable by the processor 1018 of the apparatus 1000, for performing the above-described information sending methods. For example, the non-transitory computer-readable storage medium may be a ROM, a RAM, a CD-ROM, a magnetic tape, a floppy disc, an optical data storage device, and the like.

Figure 11:
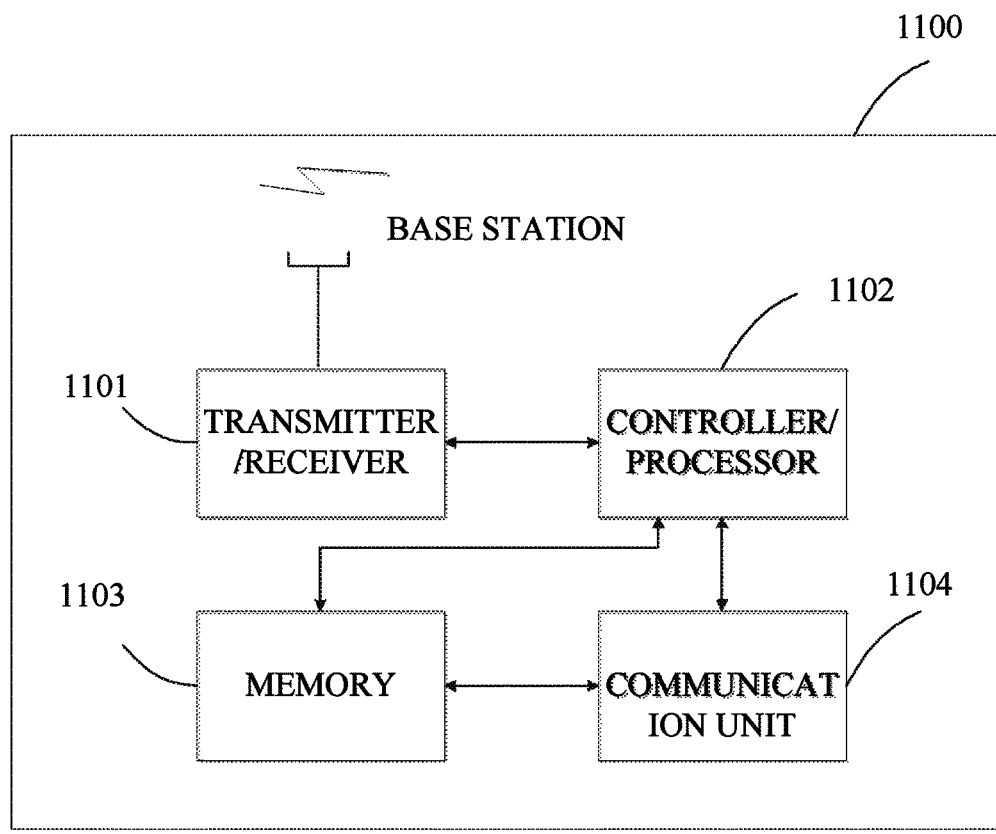
FIG. 11 is a block diagram illustrating a structure of a base station according to an embodiment of the present disclosure.

FIG. 11 is a schematic diagram illustrating one possible structure of a base station according to an embodiment of the present disclosure.

The base station 1100 comprises a transmitter/receiver 1101 and a processor 1102. The processor 1102 may be a controller, and is denoted as "controller/processor 1102" in FIG. 11. The transmitter/receiver 1101 supports information transceiving between the base station and the terminal in the above embodiments, and also supports wireless communication between the terminal and other terminals. The processor 1102 performs a variety of functions for communicating with a terminal. In the uplink, uplink signals from the terminal are received via an antenna, demodulated by the receiver 1101 (e.g., high frequency signals are demodulated into baseband signals), and further processed by the processor 1102 to restore service data and signaling informations sent by the terminal. In the downlink, service data and signaling messages are processed by the processor 1102, modulated by the transmitter 1101 (e.g., baseband signals are modulated into high frequency signals) to generate downlink signals, and transmitted to the terminal via an antenna. It is to be noted that the above functions of demodulation and modulation may also be implemented by the processor 1102.

Furthermore, the base station 1100 may further comprise a memory 1103 for storing program codes and data of the base station 1100. In addition, the base station may further comprise a communication unit 1104, which supports communications between the base station and other network entities (such as a network device in a core network). For example, in a LTE system, the communication unit 1104 may be a S1-U interface which supports communications between the base station and a Serving Gateway (SGW), or the communication unit 1104 may be a S1-MME interface which supports communications between the base station and a Mobility Management Entity (MME).

It should be understood that FIG. 11 only shows an overview of the base station 1100. In practical application, the base station 1100 may include any number of transmitters, receivers, processors, controllers, memories, communication units, etc. All base stations which can implement embodiments of the present disclosure fall within the protection scope of the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information sending method, implemented in a terminal and comprising:
   establishing a connection with a base station; and
   during establishing the connection with the base station, sending terminal capability information to the base station for connecting the terminal to a mobile data network in accordance with the terminal capability information, wherein the terminal capability information comprises at least one field representing terminal capability comprising:
   data throughput capability and
   at least one of latency capability, power consumption capability, reliability capability, enhanced Mobile Broadband (eMBB) capability, massive Machine-Type Communication (mMTC) capability and Ultra Reliable and Low Latency Communication (URLLC) capability;
   the information sending method further comprising processing a service based on network resources allocated by the base station, wherein the base station determines a type of a service to be performed by the terminal based on the terminal capability information, and allocates network resources to the terminal in accordance with the type of the service.

2. The method according to claim 1, wherein when the terminal capability includes the latency capability, the terminal capability information includes a latency capability field representing the latency capability of the terminal, and wherein the latency capability field is composed of X bits, and X is an integer greater than or equal to 1.

3. The method according to claim 1, wherein when the terminal capability includes the power consumption capability, the terminal capability information includes a power consumption capability field representing the power consumption capability of the terminal, and wherein the power consumption capability field is composed of Y bits, and Y is an integer greater than or equal to 1.

4. The method according to claim 1, wherein when the terminal capability includes the reliability capability, the terminal capability information includes a reliability capability field representing the reliability capability of the terminal, and wherein the reliability capability field is composed of Z bits, and Z is an integer greater than or equal to 1.

5. The method according to claim 1, wherein when the terminal capability includes the eMBB capability, the terminal capability information includes an eMBB capability field representing the eMBB capability of the terminal, and wherein the eMBB capability field is composed of M bits, and M is an integer greater than or equal to 1.

6. The method according to claim 1, wherein when the terminal capability includes the mMTC capability, the terminal capability information includes an mMTC capability field representing the mMTC capability of the terminal, and wherein the mMTC capability field is composed of N bits, and N is an integer greater than or equal to 1.

7. The method according to claim 1, wherein when the terminal capability includes the URLLC capability, the terminal capability information includes a URLLC capability field representing the URLLC capability of the terminal, and wherein the URLLC capability field is composed of A bits, and A is an integer greater than or equal to 1.

8. The method according to claim 1, wherein the terminal capability information includes a data throughput capability field representing the data throughput capability of the terminal, and wherein the data throughput capability field is composed of K bits, and K is an integer greater than or equal to 1.

9. The method according to claim 1, further comprising:
during establishing the connection with the base station, receiving a capability inquiry message sent by the base station, wherein the capability inquiry message instructs the terminal to send the terminal capability information to the base station.

10. The method according to claim 1, wherein sending the terminal capability information to the base station for connecting the terminal to the mobile data network in accordance with the terminal capability information comprises:
sending the terminal capability information to the base station for
determining the terminal capability based on the terminal capability information;
determining whether the terminal capability is within a capability interval, wherein endpoints of the capability interval are respectively a minimum capability and a maximum capability of the terminal supported by the mobile data network; and
connecting the terminal to the mobile data network if the terminal capability is within the capability interval.

11. An information sending apparatus, comprising:
a processor; and
a memory storing instructions executable by the processor,
wherein the processor is configured to:
establish a connection with a base station; and
during establishing the connection with the base station, send terminal capability information to the base station for connecting the terminal to a mobile data network in accordance with the terminal capability information, wherein the terminal capability information comprises at least one field representing terminal capability comprising:
data throughput capability and
at least one of latency capability, power consumption capability, reliability capability, enhanced Mobile Broadband (eMBB) capability, massive Machine-Type Communication (mMTC) capability and Ultra Reliable and Low Latency Communication (URLLC) capability;
the processor further being configured to process a service based on network resources allocated by the base station, wherein the base station determines a type of a service to be performed by the terminal based on the terminal capability information and allocates network resources to the terminal in accordance with the type of the service.

12. The apparatus according to claim 11, wherein
when the terminal capability includes the latency capability, the terminal capability information includes a latency capability field representing the latency capability of the terminal, and wherein the latency capability field is composed of X bits, and X is an integer greater than or equal to 1.

13. The apparatus according to claim 11, wherein
when the terminal capability includes the power consumption capability, the terminal capability information includes a power consumption capability field representing the power consumption capability of the terminal, and wherein the power consumption capability field is composed of Y bits, and Y is an integer greater than or equal to 1.

14. The apparatus according to claim 11, wherein
when the terminal capability includes the reliability capability, the terminal capability information includes a reliability capability field representing the reliability capability of the terminal, and wherein the reliability capability field is composed of Z bits, and Z is an integer greater than or equal to 1.

15. The apparatus according to claim 11, wherein
when the terminal capability includes the eMBB capability, the terminal capability information includes an eMBB capability field representing the eMBB capability of the terminal, and wherein the eMBB capability field is composed of M bits, and M is an integer greater than or equal to 1.

16. The apparatus according to claim 11, wherein
when the terminal capability includes the mMTC capability, the terminal capability information includes an mMTC capability field representing the mMTC capability of the terminal, and wherein the mMTC capability field is composed of N bits, and N is an integer greater than or equal to 1.

17. The apparatus according to claim 11, wherein
when the terminal capability includes the URLLC capability, the terminal capability information includes a URLLC capability field representing the URLLC capability of the terminal, and wherein the URLLC capability field is composed of A bits, and A is an integer greater than or equal to 1.

18. The apparatus according to claim 11, wherein
the terminal capability information includes a data throughput capability field representing the data throughput capability of the terminal, and wherein the data throughput capability field is composed of K bits, and K is an integer greater than or equal to 1.

19. A non-transitory computer-readable storage medium having stored therein instructions that, when executed by a processor of a mobile terminal, cause the mobile terminal to perform an information sending method, the method comprising:
establishing a connection with a base station; and
during establishing the connection with the base station, sending terminal capability information to the base station for connecting the terminal to a mobile data network in accordance with the terminal capability information, wherein the terminal capability information comprises at least one field representing terminal capability comprising:
data throughput capability and
at least one of latency capability, power consumption capability, reliability capability, enhanced Mobile Broadband (eMBB) capability, massive Machine-Type Communication (mMTC) capability and Ultra Reliable and Low Latency Communication (URLLC) capability;
the method further comprising processing a service based on network resources allocated by the base station, wherein the base station determines a type of a service to be performed by the terminal based on the terminal capability information, and allocates network resources to the terminal in accordance with the type of the service.

* * * * *